United States Patent [19]
Schatz

[11] Patent Number: 5,211,334
[45] Date of Patent: May 18, 1993

[54] MOTOR VEHICLE FLUID HEATING DEVICE WITH HEAT STORAGE

[76] Inventor: Oskar Schatz, Waldpromenade 16, D-8035 Gauting, Fed. Rep. of Germany

[21] Appl. No.: 839,026

[22] Filed: Feb. 18, 1992

Related U.S. Application Data

[63] Continuation of Ser. No. 624,494, Dec. 6, 1990, which is a continuation of Ser. No. 377,545, Jul. 10, 1989.

[51] Int. Cl.$^5$ .............................................. B60H 1/02
[52] U.S. Cl. ................................. 237/12.3 B; 126/617; 165/10
[58] Field of Search .................. 237/12.3 B; 126/436; 165/10 A

[56] References Cited

U.S. PATENT DOCUMENTS

| | | | |
|---|---|---|---|
| 2,749,048 | 6/1956 | Edge | 237/12.3 B |
| 3,498,539 | 3/1970 | Boehmfeld et al. | 237/12.3 B |
| 3,523,644 | 8/1970 | Kozinski | 237/12.3 B |
| 3,853,270 | 12/1974 | Prebil | 237/12.3 B |
| 4,371,028 | 2/1983 | Helshoj | 126/436 |
| 4,371,029 | 2/1983 | Lindner et al. | 165/436 |
| 4,556,171 | 12/1985 | Fukami et al. | 237/12.3 B |
| 4,561,493 | 12/1985 | Yanadori et al. | 165/10 A |
| 4,696,338 | 9/1987 | Jensen et al. | 165/10 A |

*Primary Examiner*—John M. Sollecito
*Attorney, Agent, or Firm*—Harness, Dickey & Pierce

[57] ABSTRACT

A vehicle heating system supplied with coolant from the engine and in the case of which there is a bypass connecting limbs of the heating circuit extending downstream from the engine and, respectively, upstream therefrom, is provided in the heating circuit with a heat storage means, which is arranged on the heating side separately from the bypass and preferably in series with the vehicle heating system.

2 Claims, 2 Drawing Sheets

MOTOR VEHICLE FLUID HEATING DEVICE WITH HEAT STORAGE

This is a continuation of U.S. patent application Ser. No. 624,494, filed Dec. 6, 1990, which is a continuation of Ser. No. 377,545, filed Jul. 10, 1989.

BACKGROUND OF THE INVENTION

The invention relates to a device for heating a motor vehicle, comprising a heat exchanger which is supplied with coolant from an engine and in the case of which a bypass is placed between the limbs of the heating circuit extending respectively downstream and upstream from the engine and the heating circuit includes a heat storage means.

Motor vehicle heating systems of this type have already been proposed. Since in the case of motor vehicle heating systems which receive their energy in the form of heat from the engine radiator water, the heating effect is only developed with a considerable time lag after starting up from cold, attempts are being made to arrange a heat storage means in the heating circuit so that it may be heated by the coolant and to arrange the heating circuit so as to bypass the engine when the coolant in the vicinity of the engine has not so far reached the required operating temperature so that after a cold start the heat of the heat storage means is transferred to the heating circuit and generally is imparted to the vehicle heating system.

So far considerations have been based on an arrangement in which the heat storage means is placed in a duct of the heating circuit bypassing the vehicle heating system. Although this does not involve any disadvantages for the transfer of heat from the heat storage means to the vehicle heating system, there is the undesired effect that the heat storage means is not able to be efficiently heated because at times the entire amount of coolant is not able to flow through the heat storage means. More especially in the case of vehicle heating systems with water regulation coolant is only able to be supplied to the heat storage means when the heating is effect is decreased by regulation. It is only when the heating is completely turned off that the heat storage means is fully included in the coolant circuit. Thus it may occur that the radiator of the engine will dissipate heat to the surroundings before the heat storage means is fully charged. It is more particularly the case of relatively short runs that there is thus the undesired effect that the heat storage means will not be completely charged and after starting up from cold will not be able to yield heat at the rate required for a rapid warm up of the interior of the motor vehicle.

SHORT SUMMARY OF THE INVENTION

One object of the present invention is to provide a vehicle heating system of the initially described type such that it may be operated with a heat storage means in such a manner that after giving up its heat it is able to be charged again, even after relatively short runs, so that it is able to bring about a rapid heating up at any time when making a cold start.

A further aim of the invention is to make this possible in a simple manner without any undesired side effects.

A still further objective of the invention is to provide such a system which does not substantially affect the heating system.

In order to achieve these or other objects appearing from the present specification, claims and drawings, the heat storage means is arranged separately from the bypass duct on the heating side and is preferably connected so as to be in series with the vehicle heating system.

This means that at all times the entire quantity of coolant is caused to pass through the heating heat storage means whatever its distribution in the heating system or the duct bypassing the latter, this providing an optimum possibility for heat exchange. A further point is that an auxiliary electrical pump, provided for the discharge of the heat storage means, may be used for charging as well and thus further improve the heat exchange.

In accordance with a preferred embodiment of the invention the heat storage means is arranged at a point upstream from the heat exchanger. As a result the entire heat content of the coolant is available at the heat storage means without heat having been extracted for the vehicle heating system. Even at low temperatures the charging of the heat storage means affects the vehicle heating system, because the coolant gives up a part of the heat upstream from the vehicle heating system. Thus in accordance with a particularly preferred form of the invention the heat storage means is embodied in the form of a latent heat storage means. This leads to the advantage that the heat storage means is heated at all times when the coolant emerging from the engine has reached or exceeded the transition temperature of the storage medium employed without this leading to any substantial effect impairing the vehicle heating system, since the capacity of a latent heat storage means for sensible heat is very low in comparison with its capacity for the latent heat.

The transition temperature for the storage medium in the heat storage means is for example 78° C., while normal vehicle heating systems so operate that the heating effect is decreased at 70° to 75° C. As long as the coolant leaving the engine has not reached the threshold value of 78° C., the coolant will hardly give up any heat in the latent heat storage means; the heat is thus fully available for heating the vehicle. If at a point downstream from the engine the coolant reaches and exceeds a temperature of 78° C., the latent heat storage means will be charged, without the coolant being thereby cooled down in the storage means to be un under 78° C., that is to say it is still hot enough for operation of the vehicle heating system. This arrangement thus leads to a particularly effective heating up of the latent heat storage means even in those cases in which the vehicle only travels relatively short distances. In particular it is possible to ensure that the radiator of the engine is not uncovered or opened prior to the heat storage means having been charged. The opening temperature of the radiator is normally 86° to 90° C.

The invention also provides a method of operating a vehicle heating system in accordance with the invention in which during charging coolant is caused to flow through the heat storage means in series with the heat exchanger. If the vehicle heating system is equipped with a latent heat storage means, the coolant will preferably flow firstly through the heat storage means and then the heat exchanger.

In accordance with a particularly convenient form of the invention the flow of the coolant through the heat storage means is shut off when a preset maximum temperature is reached. This makes it possible to preclude any vapor pressure, which may develop on overheating of the heat storage means in the storage medium, being such as to damage the storage cells when the coolant cools off and consequently the opposing pressure is decreased. This also leads to the possibility of preventing thermal decomposition of the storage medium or preventing corrosion by the storage medium. The system is preferably such that when a preset maximum temperature is reached the coolant flow bypasses the heat storage means.

The invention will now be described in more detail with reference to the working examples shown in the drawings.

LIST OF THE SEVERAL VIEWS OF THE DRAWINGS.

Figure 1:
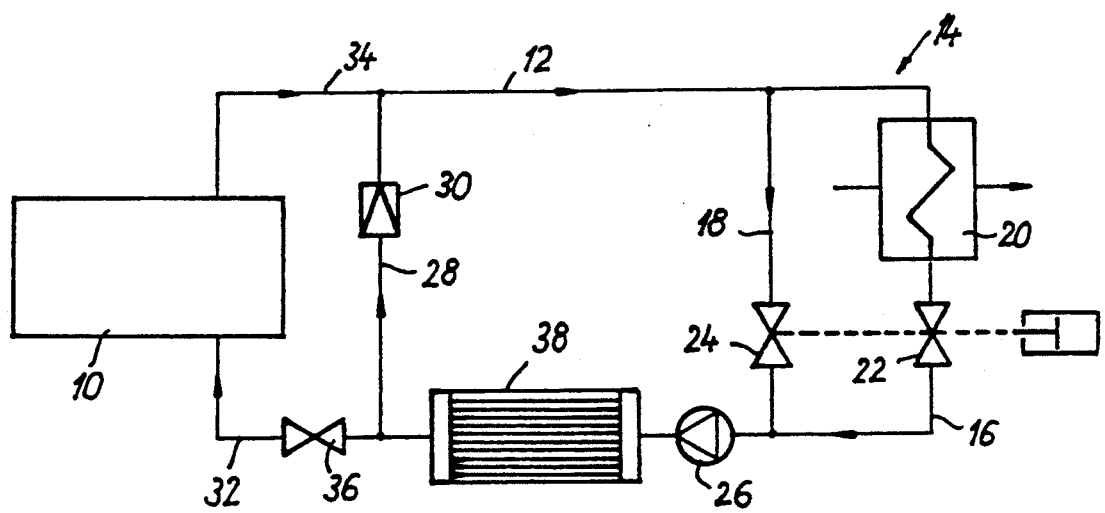
FIG. 1 shows a first embodiment of the invention with a latent heat storage means arranged downstream from a vehicle heating system with water regulation.

DETAILED DESCRIPTION OF THE INVENTION.

Like parts are denoted by like reference numerals in the two embodiments of the invention.

The coolant circuit of the vehicle heating system, generally referenced 14, extending from the engine 10, and in what follows termed the heating circuit, is generally referenced 12. It leads to the vehicle heating system 14, in which the heating circuit 12 splits up in the form of two limbs 16 and 18. The circuit limb 16 comprises a water-air heat exchanger 20, in which heat is able to be transferred from the engine coolant to the air used for heating the passenger compartment in the vehicle. The circuit limb 18 serves as a bypass with respect to the heat exchanger 20, if the heating effect is to be reduced or if it is to be shut down. In the two limbs 16 and 18 there are valves 22 and 24 able to be set in opposite directions. Downstream from the vehicle heating system 14 there is a coolant pump in the reunited heating circuit part. At a point downstream from this coolant pump 26 there is a bypass 28 with a check valve to connect the duct part 32, which returns to the engine, with the duct part 34, coming from the engine, of the heating circuit 12. In the duct part 32 there is a shut off valve 36 which when closed causes the coolant flow pumped by the coolant pump 26 to flow through the bypass 28 and thus bypass the engine.

In the case of the working example of FIG. 1 a latent heat storage means 38 is arranged in the heating circuit 12 between the vehicle heating system 14 and the coolant pump 26. This latent heat storage means 38 thus always has coolant flowing through it in the full quantity. Although part of the heat is abstracted from the coolant in the heating heat exchanger 20 so that the temperature of the coolant may be less downstream from the heating heat exchanger 20 than the transition temperature of the storage medium in the latent heat storage means 38 and accordingly the amount of coolant, which is supplied via the bypass 18 and is not cooled, contains an amount of heat available for heating the latent heat storage means 38, this amount of the heat is hardly able to be utilized in a conventional design in the latent heat storage means at any rate when there is a relatively small rate of coolant flow via the bypass 18, because owing to the small liquid flow rate in the latent heat storage means 38 there is no or hardly any turbulence. The transfer of heat to the storage medium is favored by heavy turbulence, for which reason the advantage of the arrangement is to be seen in the fact that the latent heat storage means 38 always has the entire amount of coolant flowing through it so that owing to the heavy turbulence the heat which is available may be utilized for the heating of the heat storage means in an optimum manner. Furthermore the coolant pump 26 may be turned on during charging of the heat storage means as well so that the amount of coolant flowing through the heat storage means is additionally increased.

In the case of the arrangement shown in FIG. 1 heat is abstracted from the coolant or at least a part thereof during heating operation in the heating heat exchanger 20, the drop in temperature possibly being so great that at the heat storage means 38 the transition temperature is not reached by the part of the coolant flowing via the heat exchanger 20 even if the coolant temperature at the engine has risen to such a level that the cooling system is made operational. As a result heating up of the latent heat storage means 38 in the arrangement of FIG. 1 may be unduly delayed or under certain circumstances may even become impossible, although the heat is given up and wasted by the engine via the radiator.

Figure 2:
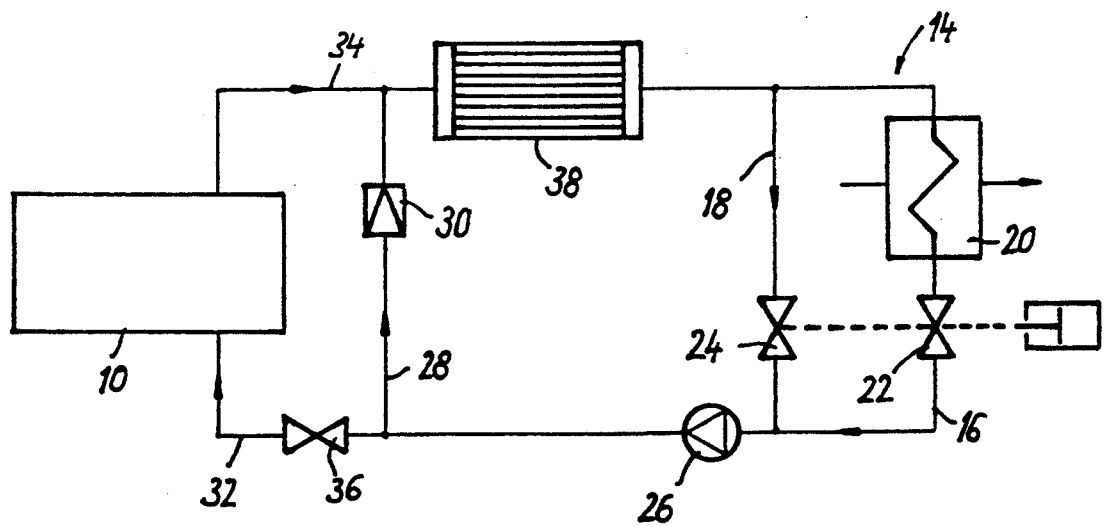
FIG. 2 is a view of further form of the invention, representing an improvement on the first embodiment with, a latent heat storage means arranged upstream from the vehicle heating system.

A design which is further improved is to be seen in FIG. 2, in which the latent heat storage means 38 is located downstream from the port of the bypass 28 into the heating circuit 12 upstream from the heating system 14. In this arrangement the entire quantity of coolant also flows through the latent heat storage means 38, albeit at the same temperature as the temperature of the coolant leaving the engine 10. Before the coolant reaches the transition temperature of the storage medium, the heat storage means is hardly able to take up any more heat and the coolant of the engine is more or less completely available for the heating of the vehicle. If the temperature of the coolant should exceed the transition temperature of the storage medium, the latent heat storage means 38 will abstract heat from the coolant as is needed for charging the heat storage means, before the coolant, whose temperature has for instance sunk to the transition temperature, flows to the heating system. Then the coolant will still have a high enough temperature to supply sufficient heat via the heat exchanger 20 for the vehicle heating system.

Because in this arrangement in accordance with FIG. 2 the latent heat storage means 38 abstracts heat from the coolant as soon as the latter has attained the transition temperature, in this arrangement more heat is abstracted than is the case with the arrangement of FIG. 1, for which reason after reaching the transition temperature the increase in temperature in the coolant, which returns via the duct 32 to the engine, will take place more slowly and accordingly the radiator will only be made operational when the heat storage means 38 is substantially fully charged.

Figure 3:
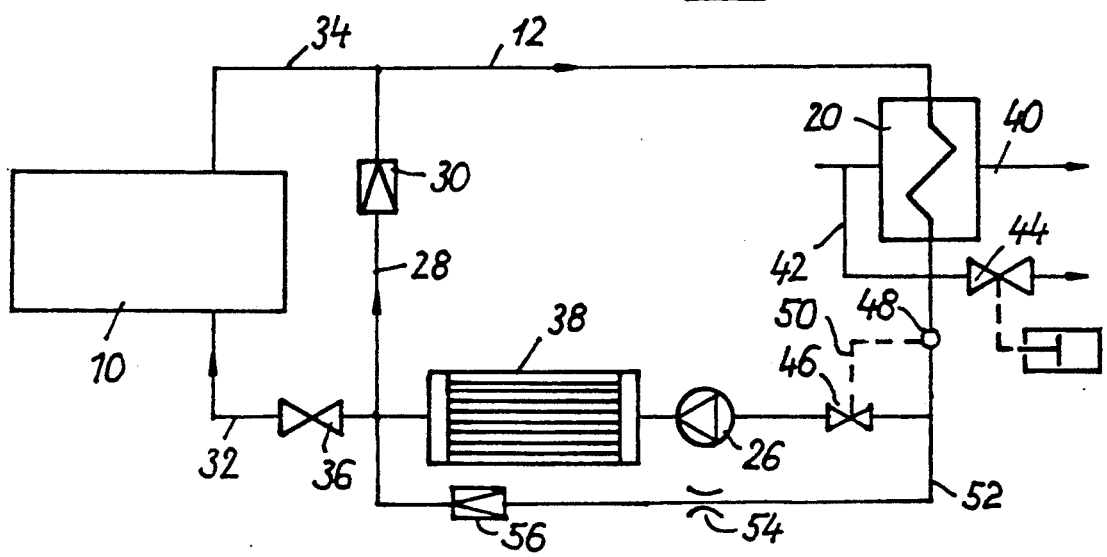
FIG. 3 shows a design similar to the that of FIG. 1 but with a vehicle heating system having air regulation.
Figure 4:
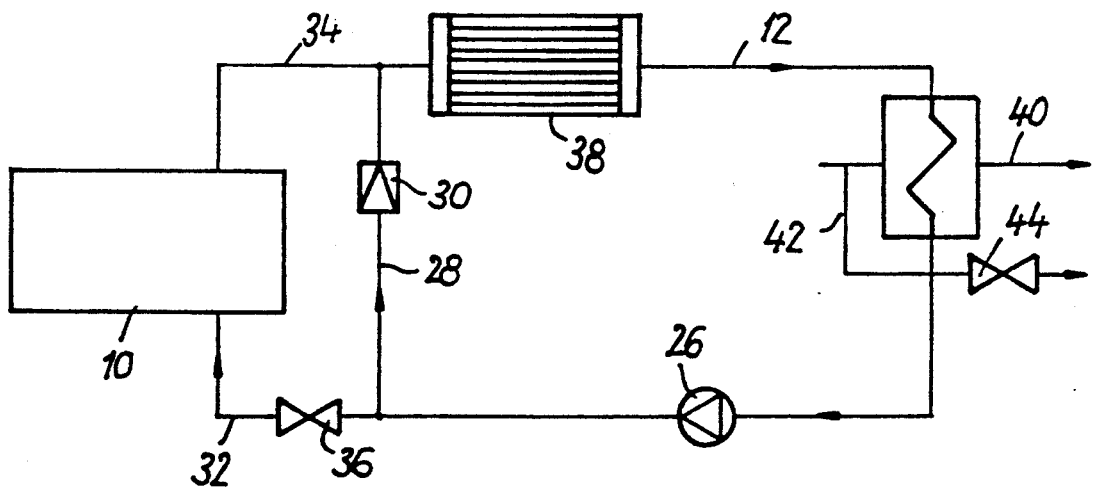
FIG. 4 shows a design similar to that of FIG. 2 but with a vehicle heating system having air regulation.

The heating systems with air regulation as shown in FIGS. 3 and 4 differ from the previously explained systems with water regulation as in FIGS. 1 and 2 only inasmuch as the duct part 18 bypassing the heat exchanger 20 and the valves 22 and 24 serving for distribution of the coolant flow between the heat exchanger 20 and this duct 18 are not present. In order to be able to adjust the action of the heating system, the air which is supplied to the interior of the vehicle and is heated by the heat exchanger 20 is passed by a duct 40 through the heat exchanger, whereas a duct 42 bypassing the heat exchanger is provided with an adjustable valve 44 so that when the latter is open the air may bypass the heat exchanger 20 and therefore does not receive any further heat from the coolant.

Furthermore FIG. 3 shows a shut off valve 46 arranged upstream from the coolant pump 26, which valve is operated in accordance with the temperature, detected by a sensor 48 placed downstream from the heat exchanger 20, of the coolant, as in indicated by a control line 50. Between the sensor 48 and the shut off valve 46 a bypass 52 for the latent heat storage means 38 branches from the coolant circuit 12. This bypass 52 opens into the heating circuit upstream from the shut off valve 36 for return of coolant thereto. There is a check valve 56 on the bypass 52 in order to determine the direction of flow.

The coolant pump 26 is located in FIG. 3 in the circuit limb including the latent heat storage means 38. However, it may also be arranged upstream from the point of branching of the bypass 52 in the coolant circuit 12. The bypass 52 then includes a choke 54 increasing the resistance to flow in order to force the coolant to flow through the latent heat storage means 38 when the shut off valve 46 is open.

When the reading of the sensor 48 corresponds to a given maximum value for the coolant temperature, the shut off valve 46 is shut in order to preclude overheating of the heat storage means 38 with the undesired effects as noted above.

I claim:

1. A motor vehicle heating device comprising a heat exchanger adapted to be supplied with coolant from an engine, the engine including a desired predetermined amount of coolant representing all of the coolant in said engine, a heating circuit defining means for providing a flow of said predetermined amount of coolant, said heat circuit comprising outlet conduit means disposed upstream of said heat exchanger for providing passage of all of the predetermined amount of coolant to pass from the engine to the heat exchanger and a return conduit means disposed downstream of said heat exchanger for providing passage of all of the predetermined amount of coolant to pass from the heat exchanger back to the engine representing a full coolant cycle, a pair of bypass duct means connected to said outlet conduit means and return conduit means such that a portion of said predetermined amount of coolant may enter said bypass duct means bypassing said heat exchanger; and a latent heat storage means coupled with one of said outlet or return conduit means and positioned in said outlet conduit means between said pair of bypass duct means such that during each full cycle all of the predetermined amount of coolant from the engine passes through said latent heat storage means transferring heat between said latent heat storage means and said coolant such that said latent heat storage means is charged and its charge dissipated only by transfer of heat between the coolant and latent heat storage means.

2. The motor vehicle heating device as claimed in claim 1 wherein the heat storage means is placed in series with the heat exchanger.

* * * * *

UNITED STATES PATENT AND TRADEMARK OFFICE
CERTIFICATE OF CORRECTION

PATENT NO. : 5,211,334
DATED : May 18, 1993
INVENTOR(S) : Oskar Schatz

It is certified that error appears in the above-indentified patent and that said Letters Patent is hereby corrected as shown below:

Column 1, line 43, "is" should be --in--.

Column 2, line 47, delete "un".

Column 3, line 2, after "pressure", delete ",".

Column 3, line 21, after "invention", delete ",".

Column 3, line 22, after "with", delete ",".

Column 3, line 25, after "to", delete "the".

Signed and Sealed this

Fourth Day of October, 1994

Attest:

BRUCE LEHMAN

*Attesting Officer*   *Commissioner of Patents and Trademarks*